United States Patent [19]
Grayson

[11] 3,845,670
[45] Nov. 5, 1974

[54] TWIN DRIVE SYSTEM

[76] Inventor: Leonard W. Grayson, P.O. Box 965, Hamilton, Mont. 59840

[22] Filed: Sept. 24, 1973

[21] Appl. No.: 399,718

[52] U.S. Cl. .................................. 74/465, 74/415
[51] Int. Cl. ..................... F16h 55/06, F16h 1/06
[58] Field of Search .............. 74/465, 464, 434, 415

[56] References Cited
UNITED STATES PATENTS

| | | | |
|---|---|---|---|
| 860,536 | 7/1907 | Ellingham | 74/465 |
| 1,176,933 | 3/1916 | Souvielle | 74/464 X |
| 1,289,508 | 12/1918 | Melcher | 74/465 |
| 1,473,907 | 11/1923 | Hettrich | 74/465 X |
| 3,490,306 | 1/1970 | Hansgen et al. | 74/465 X |

Primary Examiner—Leonard H. Gerin
Attorney, Agent, or Firm—Clarence A. O'Brien & Harvey B. Jacobson

[57] ABSTRACT

A single powered small diameter sprocket wheel is provided and meshed with large diameter driven rings or wheels journaled for rotation about generally parallel axes and provided with circumferentially spaced generally radial outer peripheral rollers in a first form of the invention wherein the single drive sprocket is disposed between the driven rings or wheels and journaled for rotation about an axis extending generally radially of the axes of rotation of the driven rings or wheels. In a second form of the invention a single driven shaft is provided and drives a pair of coaxial sprocket wheels equipped with intermediate shafts and the latter are drivingly engaged with circumferentially spaced rollers journaled from the outer peripheral portions of driven rings or wheels, the rollers journaled from the driven rings being journaled for rotation about axes generally paralleling the axes of rotation of the driven rings.

9 Claims, 6 Drawing Figures

TWIN DRIVE SYSTEM

The twin drive system of the instant invention has been primarily designed to provide a convenient and efficient manner of driving a pair of driven rings in opposite directions and at the same speed. The drive system utilizes meshing gear wheel components which allow for variances in tolerances and which need not be provided with a pressurized circulatory or bath type oiling system.

The main object of this invention is to provide a twin drive system which will be capable of driving a pair of driven rings in opposite directions and at the same speed by a single driven shaft.

Yet another object of this invention is to provide a twin drive system which will be capable of driving a pair of driven rings in opposite directions and at the same RPM whether the driven rings are coaxial or non-coaxial.

A final object of this invention to be specifically enumerated herein is to provide a twin drive system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
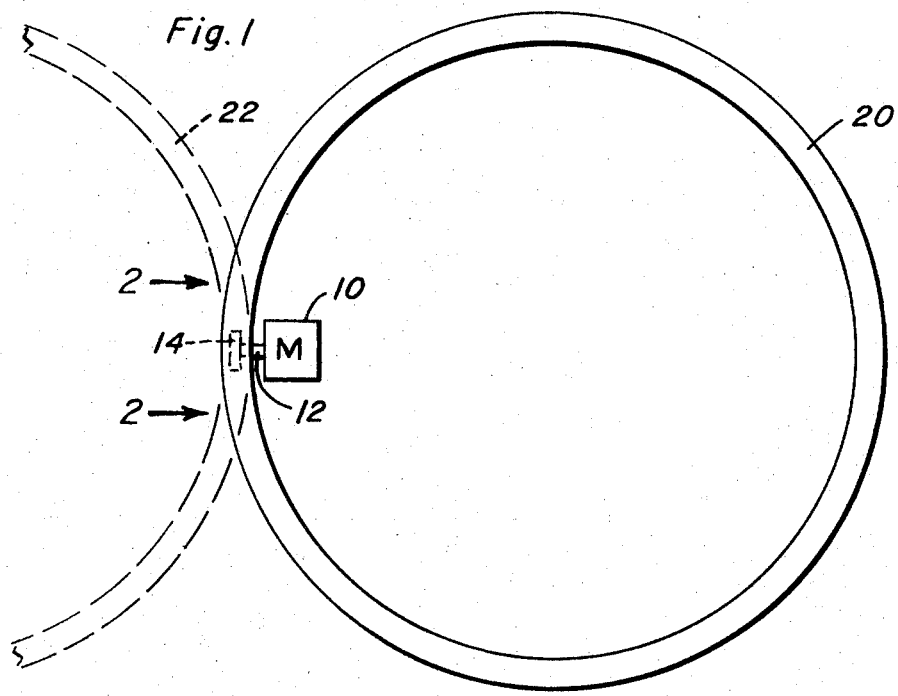
FIG. 1 is a top plan view of a first form of twin drive system constructed in accordance with the present invention.
Figure 2:
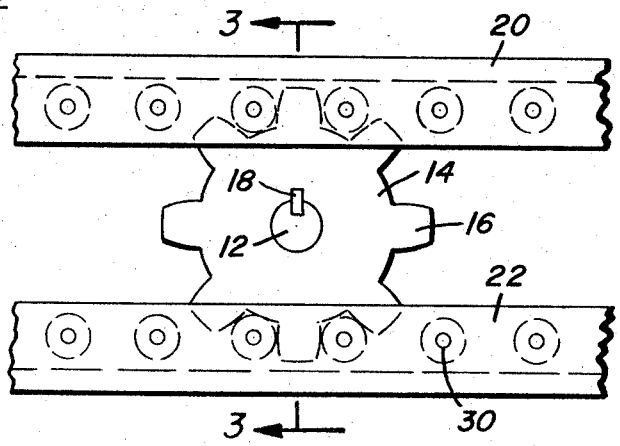
FIG. 2 is an enlarged fragmentary side elevational view as seen from the reference line 2—2 of FIG. 1.
Figure 3:
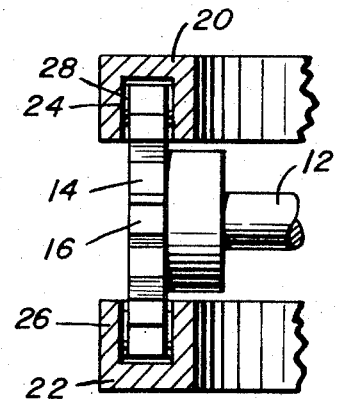
FIG. 3 is a fragmentary vertical sectional view taken substantially upon the plane indicated by the sectional line 3—3 of FIG. 2.

Referring now more specifically to FIG. 1 a stationary motor 10 is provided and includes a journaled rotary output shaft 12 upon which a gear wheel 14 is mounted for rotation therewith. In FIG. 2 it may be seen that the gear wheel 14 includes peripherally spaced gear teeth 16 and is keyed to the shaft 12 by means of a key 18. The drive system illustrated in FIGS. 1-3 further includes a pair of driven rings or wheels 20 and 22 comprising upper and lower wheels, respectively, and the outer peripheral portions of the rings 20 and 22 include outer peripheral portions provided with downwardly and upwardly opening circumferential grooves or recesses 24 and 26. A plurality of rollers 28 are spaced evenly about the grooves 24 and 26 and journaled therein by means of journal pins 30. The gear wheel 14 is disposed between the upper and lower driven rings 20 and 22 and the teeth 16 of the drive wheel 14 are meshed with the rollers 28. It is to be noted that the rollers are journaled from the pins 30 and are prelubricated and may include appropriate seals (not shown) for retention of the lubricant. Upon rotation of the shaft 12, the rings 20 and 22 will be rotated in opposite directions. Also, it is to be noted that while the rings 20 and 22 are coaxial, they may be journaled for rotation about axes spaced equally on opposite sides of the gear wheel 14. In any event, the axis of rotation of the shaft 12 is disposed substantially on a radius of each of the rings 20 and 22.

Figure 4:
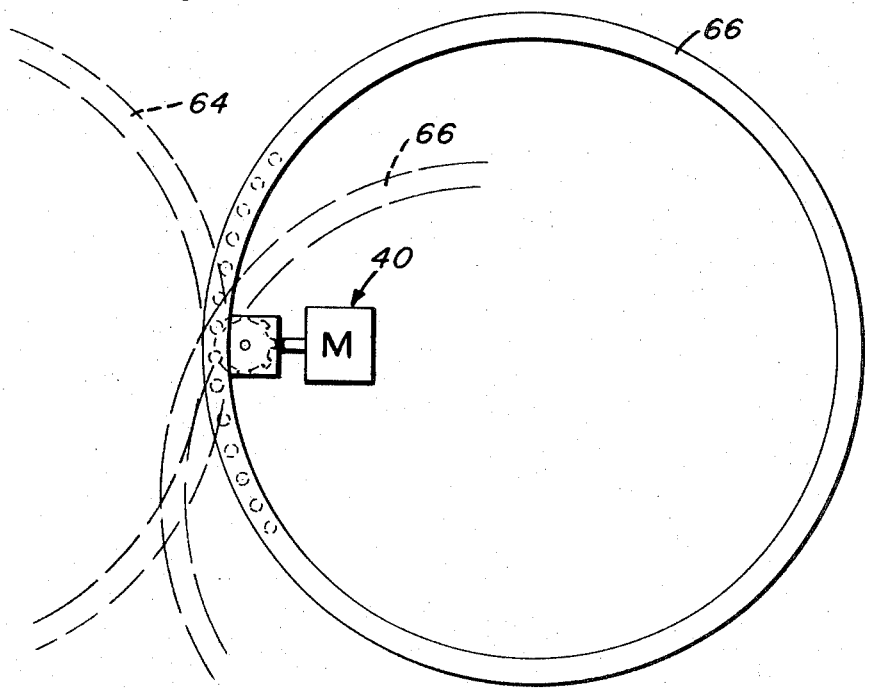
FIG. 4 is a top plan view of a second form of twin drive system of the instant invention.
Figure 5:
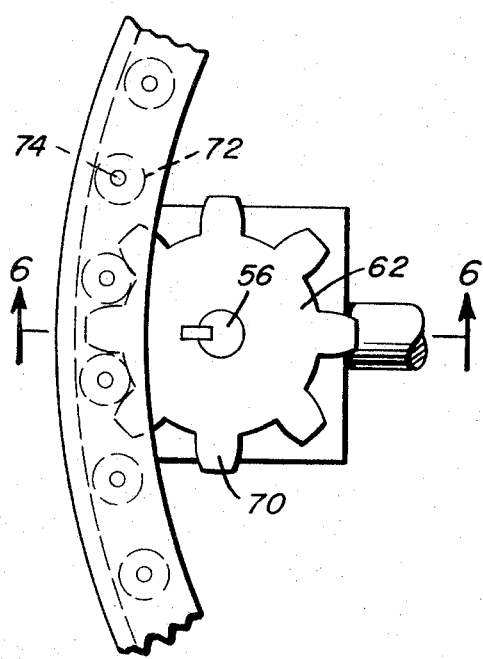
FIG. 5 is a fragmentary enlarged top plan view of the portion of the twin drive system illustrated in FIG. 4 wherein the gear wheel equipped intermediate shafts are meshed with the roller equipped peripheral portions of the driven rings.
Figure 6:
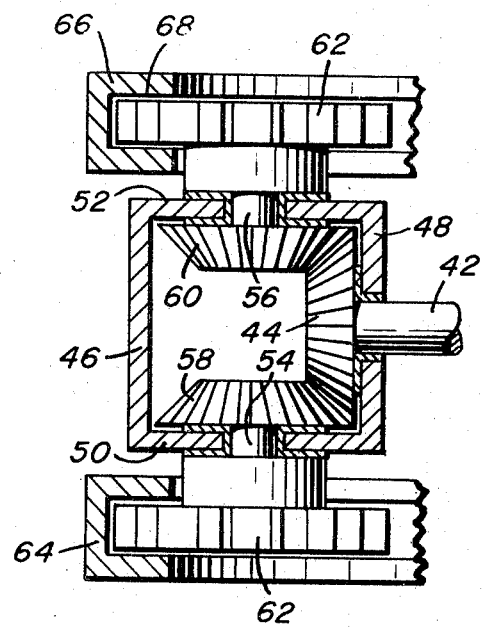
FIG. 6 is a fragmentary vertical sectional view taken substantially upon the plane indicated by the section line 6—6 of FIG. 5.

With attention now invited more specifically to FIGS. 4, 5 and 6, a second form of twin drive system is illustrated including a stationarily supported motor referred to in general by the reference numeral 40 and includes a rotary output shaft 42 having a bevel gear 44 mounted on its outer end for rotation therewith. The outer end of the output shaft 42 and the bevel gear 44 supported therefrom are disposed within a closed gear housing 46 and the shaft 42 is journaled through one side wall 48 of the housing 46. The housing 46 additionally includes a pair of opposite side walls 50 and 52 through which intermediate shafts 54 and 56 are journaled and the inner ends of the intermediate shafts 54 and 56 have bevel gears 58 and 60 mounted thereon meshed with diametrically opposite portions of the bevel gear 44. The outer ends of the intermediate shafts 54 and 56 are provided with two thick gear wheels 62 similar to the gear wheel 14 and the gear wheel 62 are mounted on the shafts 54 and 56 for rotation therewith.

A pair of driven rings or wheels 64 and 66 are provided and include radially inwardly opening circumferential grooves or recesses 68 in which the teeth 70 of the gear wheel 62 are received. The driven rings 64 and 66 include a plurality of equally circumferentially spaced rollers 72 corresponding to the rollers 28 and which are journalled from pins 74 corresponding to the pins 30. Here again, the teeth 70 of the wheel 62 are meshed with the roller 72 journaled in the recesses or grooves 68 formed in the rings 64 and 66 and accordingly, inasmuch as the gear wheels 62 are driven in opposite directions by the shaft 42, the driven rings 64 and 66 are also driven in opposite directions.

It will be noted that while the driven rings 64 and 66 are coaxial, they could be journaled for rotation about axes equally spaced on diametrically opposite sides of the intermediate shafts 54 and 56. However, if the driven rings 64 and 66 were so disposed relative to each other the groove 68 in one of the driven rings 64, 66 would be formed in the outer periphery thereof as opposed to the inner periphery thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, driven rotary shaft means journaled for rotation about a first axis, a pair of driven rings journaled for rotation about second and third parallel axes, said rings being axially spaced apart and including circumferentially spaced tooth defining rollers journaled therefrom, and drive transmission means including toothed drive wheel means drivingly connecting said rotary shaft means to said driven rings.

2. The combination of claim 1 wherein said axes of rotation of said driven rings coincide.

3. The combination of claim 1 wherein said axes of rotation of said driven rings parallel each other and are laterally spaced apart.

4. The combination of claim 1 wherein said drive transmission means includes means driving said driven rings from said rotary shaft means at the same speed and in opposite directions of rotation.

5. The combination of claim 1 wherein said circumferentially spaced tooth defining rollers are carried by inwardly facing outer peripheral portions of said driven rings.

6. The combination of claim 1 wherein said circumferentially spaced tooth defining rollers are carried by axially facing outer peripheral portions of said driven rings.

7. The combination of claim 1 wherein said circumferentially spaced tooth defining rollers are carried by outwardly facing outer peripheral portions of said driven rings.

8. The combination of claim 1 wherein said axes of rotation of said driven rings coincide, said rotary shaft means comprising axially spaced shafts having bevel gears mounted on their adjacent ends and toothed wheels on their remote ends meshed with said rollers on said driven rings, and a rotary torque input bevel gear journaled for rotation about an axis disposed at right angles relative to said first axis and having opposite peripheral portions meshed with corresponding peripheral portions of the first mentioned bevel gears.

9. The combination of claim 1 wherein said axes of rotation of said driven rings coincide, said circumferentially spaced tooth defining rollers are carried by axially facing outer peripheral portions of said driven rings, said rotary shaft means comprising a rotary input shaft extending at right angles through said coinciding second and third axes, said toothed drive wheel means being mounted on said rotary input shaft, meshed with corresponding peripheral portions of said driven rings and disposed between the latter.

* * * * *